US011706675B2

(12) United States Patent
Belling

(10) Patent No.: US 11,706,675 B2
(45) Date of Patent: Jul. 18, 2023

(54) PROVIDING HANDOVER THRESHOLDS TO THE RAN

(71) Applicant: Nokia Technologies Oy, Espoo (FI)

(72) Inventor: Thomas Belling, Erding (DE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/470,187

(22) PCT Filed: Dec. 16, 2016

(86) PCT No.: PCT/US2016/067211
§ 371 (c)(1),
(2) Date: Jun. 14, 2019

(87) PCT Pub. No.: WO2018/111304
PCT Pub. Date: Jun. 21, 2018

(65) Prior Publication Data
US 2019/0313304 A1     Oct. 10, 2019

(51) Int. Cl.
*H04W 36/00* (2009.01)
*H04W 36/24* (2009.01)
*H04W 80/10* (2009.01)
*H04W 84/04* (2009.01)

(52) U.S. Cl.
CPC . *H04W 36/0085* (2018.08); *H04W 36/00837* (2018.08); *H04W 36/24* (2013.01); *H04W 80/10* (2013.01); *H04W 84/042* (2013.01)

(58) Field of Classification Search
None
See application file for complete search history.

(56) References Cited

U.S. PATENT DOCUMENTS

| | | | |
|---|---|---|---|
| 9,380,500 B1 | 6/2016 | Stewart et al. | |
| 9,860,766 B1* | 1/2018 | Pawar | H04W 24/02 |
| 9,986,483 B1* | 5/2018 | Balmakhtar | H04W 36/00835 |
| 2010/0173632 A1* | 7/2010 | Kitaji | H04W 36/00837 |
| | | | 455/436 |
| 2010/0284374 A1 | 11/2010 | Evans | |

(Continued)

FOREIGN PATENT DOCUMENTS

| | | |
|---|---|---|
| CN | 105916218 | 8/2016 |
| EP | 2083587 | 7/2009 |

(Continued)

*Primary Examiner* — Adnan Baig
(74) *Attorney, Agent, or Firm* — Mintz Levin Cohn Ferris Glovsky and Popeo, P.C.

(57) ABSTRACT

Methods and apparatus, including computer program products, are provided for handovers including fallbacks. In some example embodiments, there is provided an apparatus comprising at least one processor and at least one memory including program code which when executed causes the apparatus to at least: receive, during creation or modification of a bearer, a message including a handover threshold based at least in part on a type of codec for the bearer; receive, from a user equipment, a measurement report providing an indication of a condition of the bearer and/or perform a measurement, by the base station, providing the indication of the condition of the bearer; determine, based at least on the handover threshold, whether to initiate a handover. Related apparatus, systems, methods, and articles are also described.

17 Claims, 7 Drawing Sheets

(56) References Cited

U.S. PATENT DOCUMENTS

| | | | | |
|---|---|---|---|---|
| 2012/0117251 | A1* | 5/2012 | Zhou | H04W 76/12 |
| | | | | 709/227 |
| 2014/0128075 | A1* | 5/2014 | Da Silva | H04W 36/30 |
| | | | | 455/436 |
| 2015/0304922 | A1* | 10/2015 | Baboescu | H04W 48/18 |
| | | | | 370/331 |
| 2016/0080977 | A1* | 3/2016 | Wei | H04L 12/1407 |
| | | | | 370/259 |
| 2016/0150445 | A1* | 5/2016 | Sandhu | H04W 36/0094 |
| | | | | 370/331 |
| 2016/0165058 | A1* | 6/2016 | Vander Mey | H04M 7/0072 |
| | | | | 370/259 |
| 2016/0212674 | A1* | 7/2016 | Nakamura | H04W 36/00837 |
| 2016/0353350 | A1 | 12/2016 | Engstrom et al. | |
| 2017/0195932 | A1* | 7/2017 | McDiarmid | H04W 36/26 |
| 2018/0063754 | A1* | 3/2018 | Wang | H04W 36/0022 |
| 2018/0270741 | A1* | 9/2018 | Enomoto | H04W 36/12 |

FOREIGN PATENT DOCUMENTS

| | | |
|---|---|---|
| WO | WO 2009008817 | 1/2009 |
| WO | WO-2014052268 A1 | 4/2014 |
| WO | WO 2015122834 | 8/2015 |

* cited by examiner

399

Receive, during creation or modification of a bearer, a message including a handover threshold based at least in part on a type of codec for the bearer — 360

Receive, from a user equipment, a measurement report providing an indication of a condition of the bearer (and/or perform measurements at the base station) — 362

Determne, based at least on the handover threshold, whether to initiate a handover — 364

Receive a message requesting the creation or modification of a bearer — 372

Send to the base station a handover threshold — 374

Send a measurement report to the base station — 378

Coupling to another bearer, when the base station decides to trigger a handover based on the handover threshold — 380

FIG. 3C

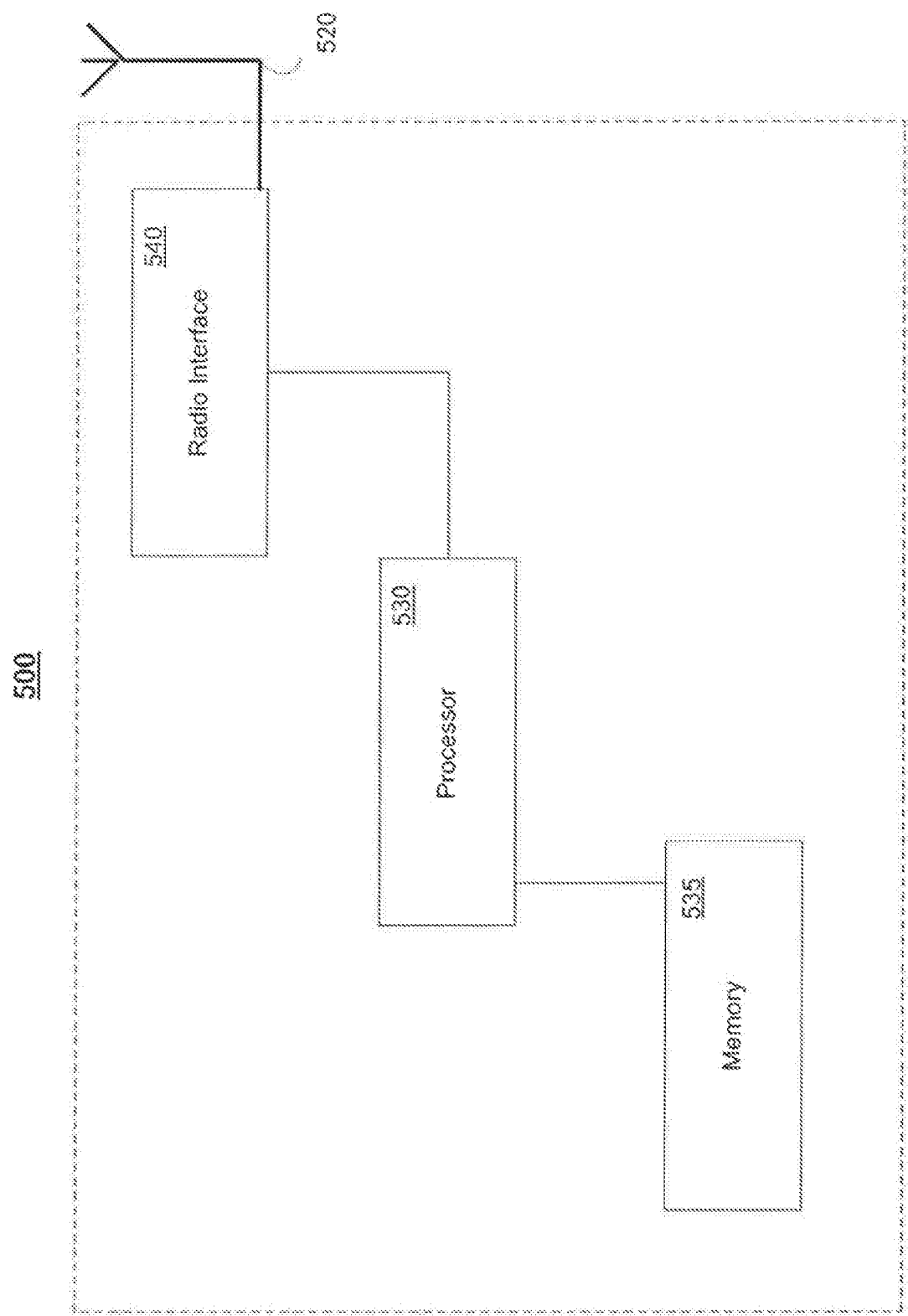

PROVIDING HANDOVER THRESHOLDS TO THE RAN

CROSS-REFERENCE TO RELATED APPLICATIONS

This application is a national stage filing of International Application No.: PCT/US2016/067211, filed Dec. 16, 2016, entitled "PROVIDING HANDOVER THRESHOLDS TO THE RAN" the contents of which are herein incorporated by reference in their entirety.

FIELD

The subject matter described herein relates to wireless and, in particular, handovers.

BACKGROUND

User equipment, such as cell phones, smart phones, tablets, and/or the like, may include a codec to encode voice calls or other media calls. For example, the codec may encode a voice signal or voice data in accordance with a codec's format, and the encoded data may then be transmitted. At the receiver, a codec may be used to decode received data into a voice signal/data to allow someone to listen to the voice signal/data. The codec can provide compression, error tolerance, and/or other features as well.

SUMMARY

Methods and apparatus, including computer program products, are provided for handovers.

In some example embodiments, there is provided an apparatus comprising at least one processor and at least one memory including program code which when executed causes the apparatus to at least: receive, during creation or modification of a bearer, a message including a handover threshold based at least in part on a type of codec for the bearer; receive, from a user equipment, a measurement report providing an indication of a condition of the bearer and/or perform a measurement, by the base station, providing the indication of the condition of the bearer; and determine, based at least on the handover threshold, whether to initiate a handover.

In some variations, one or more of the features disclosed herein including the following features can optionally be included in any feasible combination. The message may be received from a core network node and/or the user equipment. The core network node may comprise a policy and charging rules function node. The handover threshold may be determined based at least on the type of media encoding within the bearer and/or whether the media uses redundancy. The handover threshold may be derived by a core network node and/or the user equipment from session description protocol information within a session initiation protocol. The apparatus may be further configured to adjust the received handover threshold to take into account characteristics of the radio interface in use by the user equipment. The adjustment may be based on a scaling factor and/or an offset. The handover threshold may include a radio signal strength threshold, a quality threshold, and/or a packet loss threshold. The apparatus may be further configured to at least initiate the handover comprising an inter radio access technology handover. The determination of whether to initiate the handover may further include a comparison of the indication to the handover threshold. The determination of whether to initiate the handover may further include a determination of whether another radio access technology is available as a target for the handover. The handover threshold may be carried by a create bearer request message, an update bearer request message, a bearer setup request message, a bearer modify request message, and/or a radio resource control connection complete message. The base station may include an evolved node B base station.

In some example embodiments, there is provided an apparatus comprising at least one processor and at least one memory including program code which when executed causes the apparatus to at least: receive a message requesting a creation and/or a modification of a bearer; determine a handover threshold based at least in part on a codec being used for the bearer; and send the determined handover threshold to the base station.

In some variations, one or more of the features disclosed herein including the following features can optionally be included in any feasible combination. The apparatus may be further configured to at least derive the handover threshold from session description protocol information within a session initiation protocol. The handover threshold may be determined based at least in part on whether redundancy is being used for the bearer and/or based on the codec being used. The determined handover threshold may be lower for an enhanced voice service speech codec configured for a channel-aware mode when compared to the enhanced voice service speech codec excluding the channel-aware mode. The determined handover threshold may be lower for the enhanced voice service speech codec when compared to an adaptive multi-rate-wide band speech codec. The determined handover threshold may be lower for the adaptive multi-rate-wide band speech codec when compared to the adaptive multi-rate speech codec. The message may include a radio resource connection reconfiguration message. The determined handover threshold may be carried to the base station in a radio resource connection reconfiguration complete message. The handover threshold may include a radio signal strength threshold, a quality threshold, and/or a packet loss threshold.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

DESCRIPTION OF THE DRAWINGS

In the drawings,

FIG. 3B depicts an example of a process for performing a handover based on the handover threshold, in accordance with some example embodiments;

FIG. 3C depicts another example of a process for performing a handover based on the handover threshold, in accordance with some example embodiments FIG. 5 depicts an example of a network node, in accordance with some example embodiments.

Figure 1:
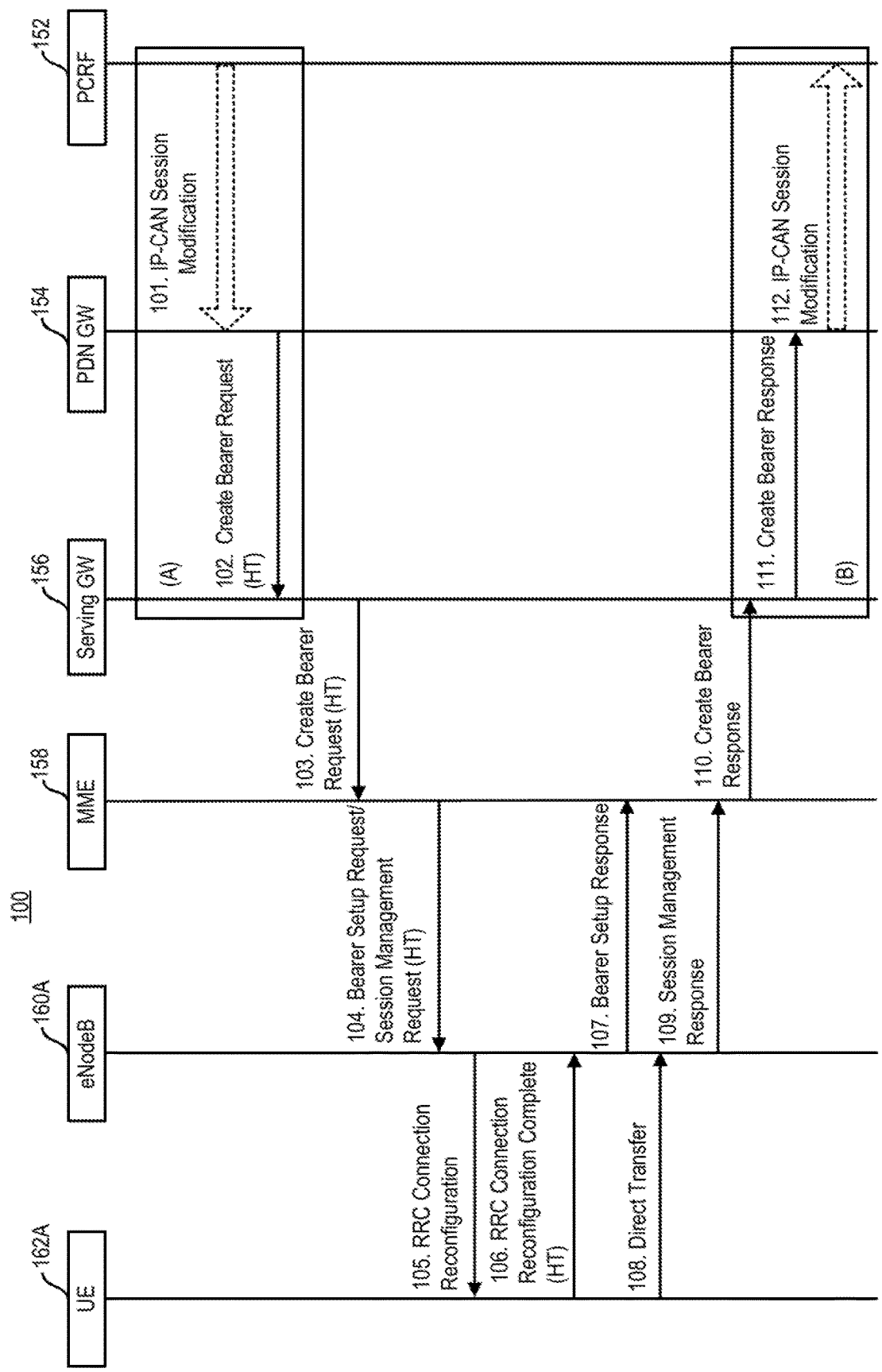
FIG. 1 depicts an example of a process for signaling, during bearer creation, a handover threshold determined based at least in part on the codec type, in accordance with some example embodiments.

Like labels are used to refer to same or similar items in the drawings.

DETAILED DESCRIPTION

User equipment may use Internet Protocol (IP) packets to carry voice, such as voice over LTE (VoLTE). When using IP transport, the user equipment can be configured to use a variety of different speech codecs available in the IP multimedia system (IMS). These codecs may be negotiated in accordance with a standard, such as 3GPP TS 26.114, Universal Mobile Telecommunications System (UMTS); LTE; IP Multimedia Subsystem (IMS); Multimedia telephony; Media handling and interaction.

Although the use of different codecs may allow flexibility in establishing a voice or multimedia bearer over IP, these different codecs can vary in robustness against packet loss when radio conditions reach a certain threshold, such as relatively poor radio conditions. In other words, each codec may behave differently when operating in poor radio conditions (e.g., a low quality connection, high bit errors, packet loss, high rate of packet loss, poor signal to noise ratio, and/or the like). To illustrate, a user equipment configured with a channel-aware mode of the enhanced voice service (EVS, see, e.g., 3GPP TS 26.441) speech codec may be considered more robust against packet loss, when compared to the adaptive multi-rate (AMR) speech codec (see, e.g., 3GPP TS 26.073). Moreover, robust operation in the face of poor radio conditions may be further improved for certain codecs by using redundant frame transmission with the real time transmission protocol (RTP) as described for example in 3GPP TS 26.114.

To allow a voice call to continue in poor radio conditions, the user equipment may be configured to support an IP fallback or a handover to another bearer. The handover or fallback may be to another bearer having another radio access technology such as a circuit switched bearer, although the fallback or handover may be to other types of bearers including the same or different radio access technology as well. The user equipment may perform a single radio voice call continuity (SRVCC) fallback from IP switched transmission (e.g., over an LTE air interface) to a circuit switched transmission (e.g., over the UTRAN or GSM air interface).

As noted however, the need to fallback or handover under poor radio conditions may be dictated in part by the specific codec being used as codecs have a range of robustness when operating under poor radio conditions. During a call using an EVS codec for example, the user equipment may be able to handle a greater degree of packet loss, when compared to a situation in which the user equipment is using an AMR codec. In this example, a given amount of packet loss may be acceptable to the operation of the EVS codec, so the SRVCC fallback may not be necessary as the EVS codec can continue to operate properly. However, that same amount of packet loss may be problematic with the AMR codec, in which the SRVCC fallback may be necessary as the AMR codec cannot continue to operate properly.

When a fallback to for example the circuit switched bearer is needed for the voice or media call continuity, the decision to fallback to another radio access technology, such as a circuit switched bearer, may be made by the radio access network (RAN), such as an evolved node B base station. Although core network nodes may know the codec being used by a given user equipment, the radio access network (RAN) including the evolved node B base station (which decides whether to perform the fallback/handover to circuit switched bearer) may not be aware of the actual codec in use at a user equipment for a given call having IP switched-based transport.

In some example embodiments, when requesting establishment of, or modification to, a bearer to transport voice or other media, a core network node (e.g., a node providing policy such as the policy and charging rules function (PCRF) node) may signal a radio access node such as a base station.

In some example embodiments, the signaling may include an indication about a handover threshold determined based at least in part on the type of codec being, or to be, used for the bearer. As such, the radio access node may trigger a fallback or a handover from an IP switched based bearer to another bearer such as a circuit switched bearer (or another radio access technology), when the observed transmission quality is below (or worse than) the signaled handover threshold for that bearer (which as noted is determined based at least in part on the specific type of codec being, or to be, used for the bearer and/or whether redundancy is being used for the bearer).

When a codec is negotiated during call establishment (or at other times such as during a call modification), a core network node, such as the proxy call state control function (P-CSCF), may obtain information about the codec to be (or being) used for the call and/or whether any redundancy is being used for the call. The codec or redundancy information may be determined from the information associated with the codec negotiation (e.g., the session description protocol, SDP, offer-answer negotiation within the session initiation protocol), in accordance with some example embodiments. After obtaining the information, the core network node, such as the P-CSCF, may provide this information to another core network node, such as the PCRF, via for example an interface, such as the Rx interface. Based on the codec information and/or redundancy information for the call being created or modified, the PCRF may derive a handover threshold for the call given the corresponding codec and/or whether redundancy is used.

In some example embodiments, a core network node such as the PCRF may signal the handover threshold information (which may be derived based at least in part on the codec type and/or redundancy information) to a core network node such as the packet data network gateway (PDN GW). The handover threshold may be signaled over an interface, such as the Gx interface.

In some example embodiments, a core network node such as the PCRF may signal the handover threshold information to the packet data network gateway (PDN GW) as part of a new or modified policy and charging (PCC) rule within an IP connectivity access network (IP CAN) session modification request message. The IP CAN session modification request message may describe the media being transported using the "new" codec being used or to be used for the bearer being established or modified, and this signaling may not include explicit information about the codec, but instead the handover threshold.

In some example embodiments, the handover threshold information may be expressed as a required radio signal strength, quality (see, e.g., RSRP, RSRQ, and/or the like), a maximum tolerable packet loss, and/or the like.

In some example embodiments, a core network node, such as the PCRF, may receive information about the codec being used and analyze the received codec information to derive a handover threshold. For example, based on the codec-data attribute value pair (AVP) and the session description protocol (SDP) information within that AVP received from the P-CSCF, the PCRF may determine the codec being used and/or whether redundancy is being used.

To illustrate further, if the PCRF determines that the EVS speech codec is being used in a configuration including the channel-aware mode, the PCRF may assign a lower handover threshold to allow poorer radio conditions for example, when compared to the EVS speech codec being used in a configuration that excludes the channel-aware mode. Moreover, the PCRF may assign a higher handover threshold when the codec being used is the AMR-wideband (WB) speech codec. Furthermore, the PCRF may assign an even higher handover threshold for the AMR speech codec, when compared to the AMR-WB speech codec and the EVS speech codec. The PCRF can determine the EVS codec is being used in a configuration including the channel-aware mode, if WB and/or SWB bandwidth are allowed and the 13.2 kbps bit rate is allowed according to the bw, bw-send, bw-recv, br, br-send, and/or br-recv MIME parameters of the EVS codec defined in 3GPP TS 26.445, which will be contained in SDP "a=fmtp" attributes. The PCRF can determine the codec type, such as EVS, AMR-WB, AMR, and/or other codec types, based on the SDP "a=rtpmap" attribute.

When redundant transmission is negotiated for a given codec, the PCRF may assign a lower handover threshold for a codec to permit poorer radio conditions of the bearer, when compared to a call for the same codec without redundant transmission. For example, the PCRF may determine whether the call includes redundant transmission from the SDP negotiation (e.g., the maxptime MIME parameter contained in SDP "a=fmtp" attribute and the bandwidth according to the Max-Requested-Bandwidth-UL and Max-Requested-Bandwidth-DL audio video profiles may allow for a repetition of codec frames).

In some example embodiments, the user equipment may derive the handover threshold. For example, when a user equipment accepts the establishment or modification of a bearer to transport media such as voice, video, and/or the like, the user equipment may signal to a radio access node such as the base station an indication about the handover threshold for the bearer being established or modified. Like in the case of the core network node described above, the user equipment may derive, from the SDP offer-answer negotiation within SIP, information about the used codec and whether redundancy is used. For example, the user equipment may use the same or similar approach as described above with the PCRF to derive a handover threshold from the session description protocol (SDP) and/or the like. When the user equipment derives the codec type and/or use or whether redundancy is being used for a bearer, the user equipment may derive a handover threshold and signal to the base station the determined handover threshold for the bearer. In some example embodiments, the user equipment may signal the base station using a message including the handover threshold. In some example embodiments, the message carrying the handover threshold may include the radio resource control (RRC) connection reconfiguration complete message.

FIG. 1 depicts an example process 100 for signaling, during call set-up/creation, a handover threshold, in accordance with some example embodiments.

At 101, a core network node, such as PCRF 152, may send a session modification message to a packet gateway 153, in accordance with some example embodiments. As noted above, the PCRF may determine the type of codec used (e.g., being used or to be used) for a given call, such as a voice over LTE call (VoLTE) or other type of IP switched call and/or whether there is redundancy on being used. Based on the codec type and/or redundancy, the PCRF may determine a handover threshold. In some example embodiments, the session modification message may be extended to include the handover threshold based at least in part on the codec being used. The session modification message may comprise an IP-CAN session modification message, although other types of messages may be used as well. The IP-CAN session modification message may include policy and charging (PCC) rules encoded within charging-rule-definition AVP, and the handover threshold may be encoded as a new AVP within the charging-rule-definition AVP. The packet gateway 154 may decide on the information within the PCC rule to establish/create a new bearer or modify an existing bearer.

At 102-103, the packet gateway 154 may send a create bearer request message to a mobility management entity 158 via a serving gateway 156, in accordance with some example embodiments. In some example embodiments, the create bearer request message may be extended to include the handover threshold determined based at least in part on the codec being used and/or whether redundancy is being used. Based on the PCC rule, the packet gateway may decide, in which IP CAN bearer the voice/media are to be transported in, and then establish or modify that bearer. To that end, the packet gateway may send the create bearer request including the handover threshold (or an update bearer request including handover threshold as described with respect to FIG. 2 below) via the serving gateway 156 to the mobility management entity 158. The handover threshold is labeled as "HT" in FIG. 1. In response, the mobility management entity 158 may send, at 104, a bearer setup request including the handover threshold (or bearer modify request including the handover threshold as described with respect to FIG. 2 below) to the base station 160A, such as an evolved Node B base station (labeled eNodeB).

At 105, the base station may send a radio resource control (RRC) connection reconfiguration message, which may cause a response at 106 in the form of a radio resource control (RRC) connection reconfiguration complete. At 107, the base station 160A may send a bearer setup response message to the mobility management entity 158. At 108, the user equipment 162A may use the bearer and transfer data. At 109, the base station 160A may send a session management response to the mobility management entity 158. At 110-111, the mobility management entity 158 may send a create bearer response to the packet gateway 154 via the serving gateway 156, which sends at 112 a IP CAN session modification message to the PCRF 152.

In some example embodiments, the user equipment may derive the handover threshold, as noted above. When this is the case, the user equipment may, in accordance with some example embodiments, include the handover threshold in the radio resource control (RRC) connection reconfiguration complete sent to the base station at 106, although the user equipment may signal the handover threshold for a given bearer to the base station in other messages as well.

The base station 160A may perform a handover or a fallback based on the handover threshold determined based at least in part on the codec being used for a bearer and/or whether redundancy is being used for that bearer, in accordance with some example embodiments. For example, the base station may perform handovers based on measurement reports received from the user equipment 162A (as well as other measurements performed or collected by the base station). When a measurement report is received or collected, the base station 162A may, based on the handover threshold received at 104, determine whether the user equipment should fallback or be handed over. In some example embodiments, the base station may apply a scaling factor to the handover threshold, and/or add or subtract a corrective offset. The scaling factor and/or a corrective offset may take into account the capabilities of the air interface technology that is currently in used, such as the specific type of radio access type being used, the modulation and coding scheme being used, and/or the like. The scale factor/offset may allow the PCRF (or the user equipment when it derives the handover threshold) to provide a handover threshold value without taking into the air interface currently being used by the radio access network to serve the user equipment (as the base station can adjust the handover threshold value using the scaling factor/offset to take into account the air interface currently being used by the radio access network).

To determine whether to perform a handover or fallback, the base station 160A may compare a measurement report value for the bearer to the handover threshold determined based at least in part on the codec being used for a bearer and/or whether redundancy is being used for that bearer (which may be scaled/offset applied as noted). Based on this comparison, the base station may decide to trigger a handover or fallback, such as an inter-RAT handover for example, when the observed radio conditions fall below (or get worse than) the handover threshold and an alternative RAT is available. In this way, the quantity of such inter-RAT handovers (which can cause a noticeable service interruption) may be kept minimal.

Figure 2:
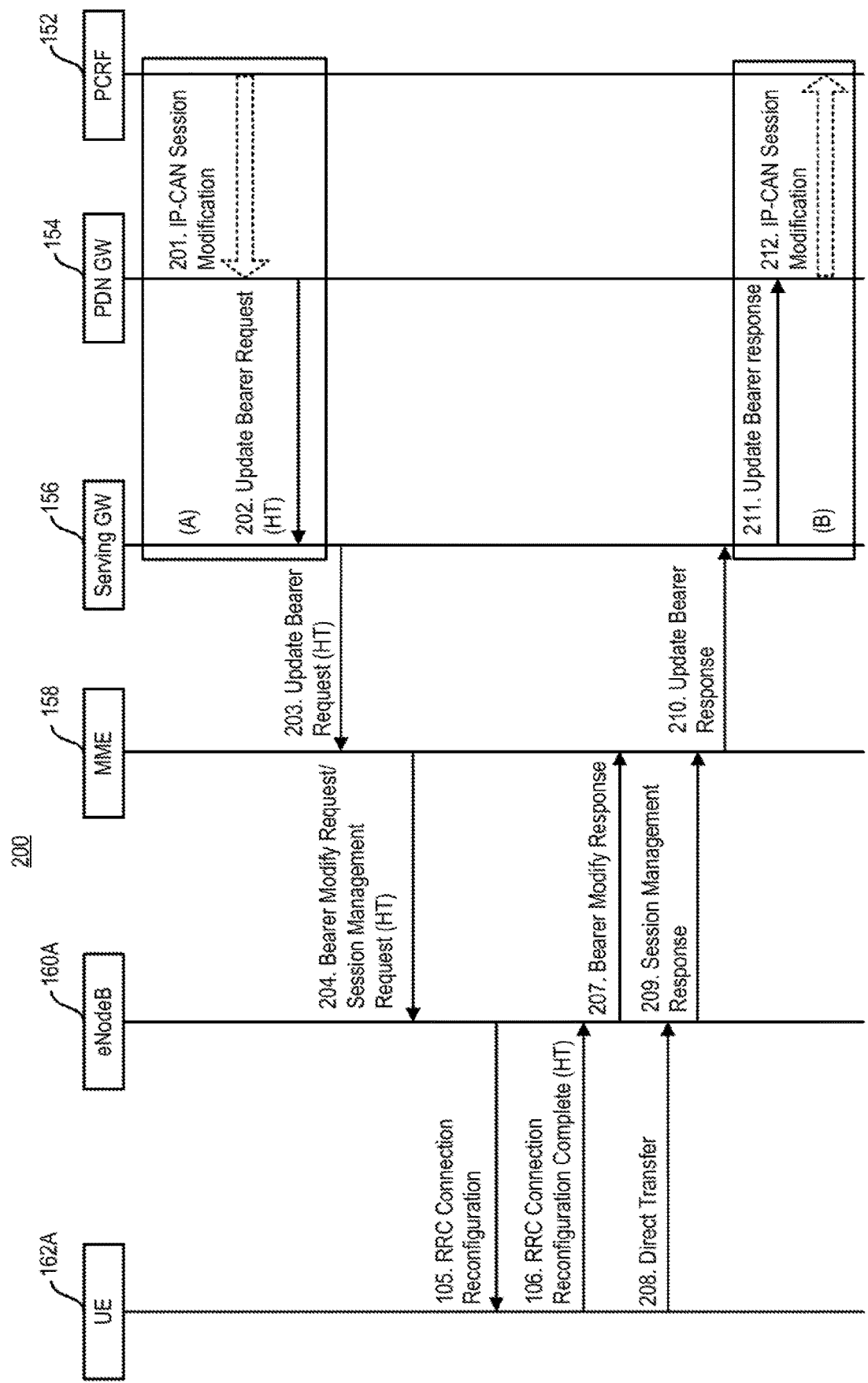
FIG. 2 depicts an example of a process for signaling, during bearer modification, a handover threshold determined based at least in part on the codec type, in accordance with some example embodiments.

FIG. 2 depicts an example process 200 for signaling a handover, in accordance with some example embodiments. FIG. 2 is similar to FIG. 1 in some respects but depicts the update bearer process, rather than the create bearer process of FIG. 1. In process 200, the update bearer request (202, 203) and bearer modify request (204) messages are extended to include the handover threshold information (HT) as in the case of process 100. Moreover, in embodiments in which the user equipment derives the handover threshold threshold determined based at least in part on the codec being used for a bearer and/or whether redundancy is being used for that bearer, the user equipment 162A may send the handover threshold (HT) in a message to the base station 160A, such as the RRC connection reconfiguration complete message 106.

Before providing additional examples, the following provides an example of a system framework in which some of the example embodiments described herein may be implemented.

Figure 3A:
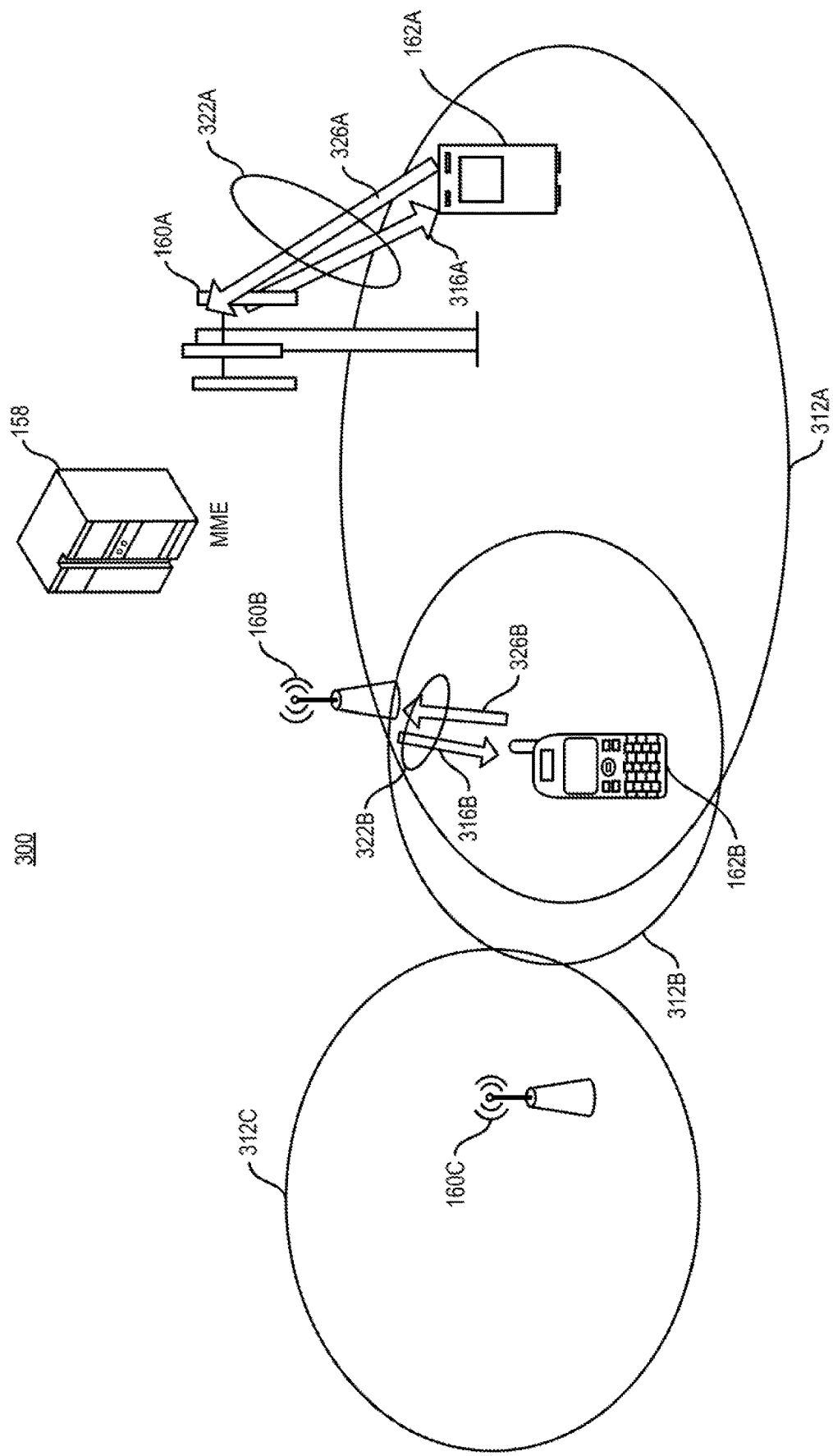
FIG. 3A depicts an example of a system, in accordance with some example embodiments.

FIG. 3A depicts a system 300 according to some example embodiments. System 300 may include one or more user equipment, such as user equipment 162A-B, and one or more access points, such as base stations 160A-C. In some example embodiments, base station 160A may serve a cell, such as cell 312A, and base station 610B may serve another cell 162B, although base stations 160A-B may serve other cells as well. Moreover, the base stations 160A-C may have wired and/or wireless backhaul links to other network nodes, other base stations, a radio network controller, a core network (which may include a mobility management entity (MME) 158, a serving gateway 156, a packet gateway 154, and a PCRF 152), and/or the like.

In some example embodiments, user equipment 162A-B may be implemented as a mobile device and/or a stationary device. The user equipment 162A-B are often referred to as, for example, mobile stations, mobile units, subscriber stations, wireless terminals, tablets, smart phones, a wireless handheld device, a wireless plug-in accessory, or the like. In some example embodiments, the user equipment may include one or more processors, one or more computer-readable storage medium (for example, memory, storage, and/or the like), one or more radio access components (for example, a modem, a transceiver, and/or the like), and/or a user interface. In some example embodiments, the user equipment 162A-B may be implemented as multi-mode user devices configured to operate using a plurality of radio access technologies, although a single-mode device may be used as well. For example, user equipment 162A-B may be configured to operate using a plurality of radio access technologies, in which case user equipment 162A-B may be configured to have established connections to access points 160A-C using a plurality of the radio access technologies. The base stations 160A-C may, in some example embodiments, be implemented as an evolved Node B (eNB) type base station, although other types of radio, access points may be implemented as well. For example, user equipment 162B may be handed over, based on the handover threshold, from a first bearer served by source base station 160B to a second bearer served by a target base station 160A.

In some example embodiments, system 300 may include access links, such as links 322A-B. The access links 322A may include a downlink 316A for transmitting to the user equipment 162A and an uplink 326A for transmitting from user equipment 162A to the base station 160A. The downlink 316A may comprise a modulated radio frequency carrying information, such as user data, radio resource control (RRC) messages, information configuring a user equipment, handover commands, and/or the like, to the user equipment 162A, and the uplink 326A may comprise a modulated radio frequency carrying information, such as user data, RRC messages, user equipment capabilities reporting, measurement reports, and/or the like, from the user equipment 162A to base station 160A. Access links 322B may include downlink 316B for transmitting from the base station 160B to user equipment 162B, and uplink 326B for transmitting from user equipment 162B to the base station 160B. Although FIG. 3A depicts access links between certain user equipment and certain base stations, the user equipment and base stations may have additional links to other devices as well. Furthermore, although FIG. 3A depicts a specific quantity and configuration of base stations, cells, and user equipment, other quantities and configurations may be implemented as well.

FIG. 3B depicts an example process 399 for performing a handover based on the handover threshold, in accordance with some example embodiments.

At 360, the base station 160A may receive a message including a handover threshold determined based at least in part on the codec being used for a bearer and/or whether redundancy is being used for that bearer, in accordance with some example embodiments. For example, the base station 160A may receive a message requesting a bearer setup or requesting a modification to an existing bearer. This message may include the handover threshold provided by the core network, such as the PCRF, packet gateway, and/or other nodes, although in some example embodiments the user equipment may derive and provide the handover threshold as well.

At 362, the base station may receive a measurement report from the user equipment, in accordance with some example embodiments. The measurement report may provide an indication of the radio conditions for the bearer. For example, the measurement report may indicate quality, error rate, packet loss, and/or the like, and these values may be used in to determine whether to handover or fallback. The base station may also perform (or collect) measurements as well. For example, the base station may measure the condition of the link to the user equipment. The base station's measurement(s) may be used alone, or in combination with the values in the user equipment's measurement report to trigger a handover or fallback.

At 364, the base station may decide whether to trigger a handover based on the handover threshold determined based at least in part on the codec being used for a bearer and/or whether redundancy is being used for that bearer, in accordance with some example embodiments. For example, the base station 160A may compare a measurement report value for the bearer (and/or the base station's own measurements as noted above) to the handover threshold for that bearer, which as noted was determined specifically for the bearer (e.g., the type of codec and/or whether redundancy is being used). Based on the comparison, the base station may decide to initiate a handover or fallback, such as an inter-RAT handover, when the observed radio conditions fall below the handover threshold (which indicates that the radio conditions are below a threshold that the codec and/or redundancy can handle) and another bearer or RAT is available. For example, the base station may handover to a circuit switched bearer, although the base station may handover to the same radio access technology as well.

FIG. 3C depicts an example process 370 for performing a handover based on the handover threshold, in accordance with some example embodiments.

At 372, the user equipment may receive a message requesting the creation, or modification, of a bearer, in accordance with some example embodiments. Referring to FIGS. 1 and 2 as well, the user equipment 162A may receive a RRC connection reconfiguration message. This message may trigger the user equipment 162A to respond to the base station with a handover threshold derived by the user equipment. To that end, the user equipment 162A may, as noted, derive the handover threshold that takes into account the codec type for the bearer being established or modified and/or whether redundancy is being used with the bearer (for example, derive the codec and/or redundancy from the SDP negotiation information as noted herein).

At 374, the user equipment 162A may send to the base station 160A the handover threshold determined, by the user equipment, based at least in part on the codec being used for a bearer and/or whether redundancy is being used for that bearer derived by the user equipment, in accordance with some example embodiments. In some example embodiments, the user equipment may send to the base station the handover threshold in a message, such as RRC configuration complete message 106, although other messages may be used as well.

At 378, the user equipment 162A may send a measurement report to the base station 160A, in accordance with some example embodiments. The measurement report may provide an indication of the radio conditions for the bearer. For example, the measurement report may indicate quality, error rate, packet loss, and/or the like of the bearer being created or modified. As noted, the base station may perform some of its own measurements, and the base station measurements may be used to trigger the handover at 380 as well.

At 380, the user equipment may be handed over, when the base station decides to trigger a handover based on the handover threshold determined based at least in part on the codec being used for a bearer and/or whether redundancy is being used for that bearer, in accordance with some example embodiments. For example, the base station 160A may compare a measurement report value (or the base station's own measurements) about the bearer to the handover threshold for that bearer, which as noted was determined specifically for the bearer (e.g., the type of codec and/or whether redundancy is being used). Based on the comparison, the base station may decide to initiate a handover or fallback, such as an inter-RAT handover, when the observed radio conditions fall below the handover threshold and another RAT is available. The base station may handover to another RAT.

Figure 4:
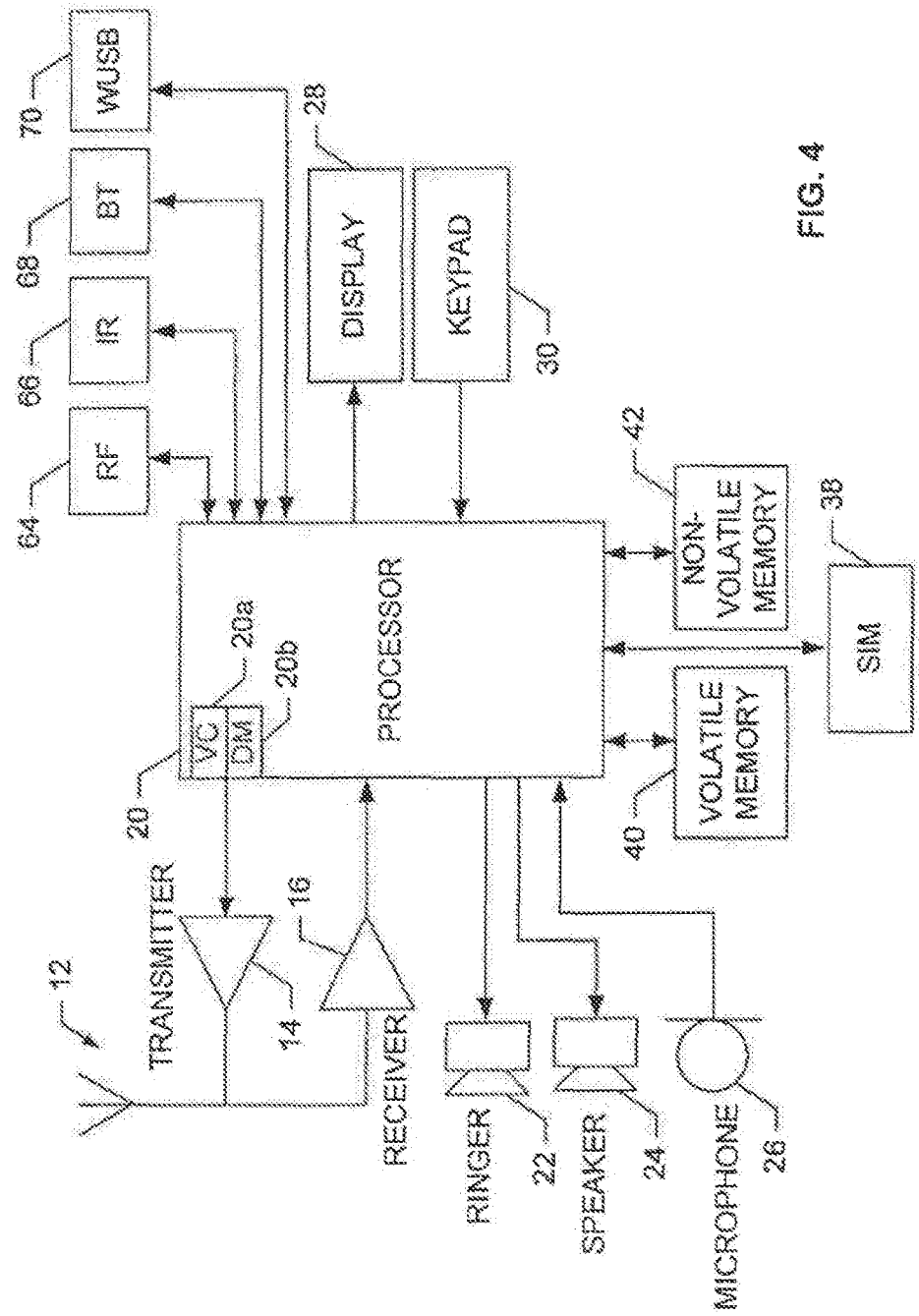
FIG. 4 depicts an example of a radio, in accordance with some example embodiments.

FIG. 4 illustrates a block diagram of an apparatus 10, in accordance with some example embodiments. The apparatus 10 may be implemented at a user equipment, such as a smartphone cell phone, tablet, IoT device, and/or other processing device. The apparatus 10 may perform one or more operations disclosed herein with respect to a user equipment. In accordance with some example embodiments, the apparatus 10 may derive the handover threshold and provide the handover threshold to the base station as noted herein (see, e.g., FIG. 3C and corresponding description).

The apparatus 10 may include at least one antenna 12 in communication with a transmitter 14 and a receiver 16. Alternatively transmit and receive antennas may be separate.

The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of apparatus 10 by effecting control signaling via electrical leads connecting processor 20 to the other elements, such as for example a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Apparatus 10 may include a location processor and/or an interface to obtain location information, such as positioning and/or navigation information. Accordingly, although illustrated in FIG. 4 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as for example, Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as for example, Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as for example, Long Term Evolution (LTE), Evolved Universal Terrestrial Radio Access Network (E-UTRAN), and/or the like. Additionally, for example, the apparatus 10 may be capable of operating in accordance with 4G wireless communication protocols and/or 5G wireless communication protocols as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions and other operations as disclosed herein with respect to a user equipment (see, e.g., process 100, 200, 370, and/or 399). For example, processor 20 may be capable of operating a connectivity program, such as for example, a web browser. The connectivity program may allow the apparatus 10 to transmit and receive web content, such as for example location-based content, according to a protocol, such as for example, wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as for example, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as for example, a keypad 30 (which can be a virtual keyboard presented on display 28 or an externally coupled keyboard) and/or other input devices.

As shown in FIG. 4, apparatus 10 may also include one or more mechanisms for sharing and/or obtaining data. Moreover, the apparatus 10 may include a short-range radio frequency (RF) transceiver and/or interrogator 64, so data may be shared with and/or obtained from electronic devices in accordance with RF techniques. The apparatus 10 may include other short-range transceivers, such as for example an infrared (IR) transceiver 66, a Bluetooth (BT) transceiver 68 operating using Bluetooth wireless technology, a wireless universal serial bus (USB) transceiver 70, and/or the like. The Bluetooth transceiver 68 may be capable of operating according to low power or ultra-low power Bluetooth technology, for example, Wibree, radio standards. In this regard, the apparatus 10 and, in particular, the short-range transceiver may be capable of transmitting data to and/or receiving data from electronic devices within a proximity of the apparatus, such as for example within 10 meters. The apparatus 10 including the WiFi or wireless local area networking modem may also be capable of transmitting and/or receiving data from electronic devices according to various wireless networking techniques, including 6LoWpan, Wi-Fi, Wi-Fi low power, WLAN techniques such as for example IEEE 802.11 techniques, IEEE 802.15 techniques, IEEE 802.16 techniques, and/or the like.

The apparatus 10 may comprise memory, such as for example, a subscriber identity module (SIM) 38, a removable user identity module (R-UIM), and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory, and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the user equipment/mobile terminal. The memories may comprise an identifier, such as for example an international mobile equipment identification (IMEI) code, capable of uniquely identifying apparatus 10. The functions may include one or more of the operations disclosed herein for a user equipment including for example the functions disclosed at processes 100, 200, 370, 399, and/or the like. The memories may comprise an identifier, such as for example, an international mobile equipment identification (IMEI) code, capable of uniquely identifying apparatus 10. In the example embodiment, the processor 20 may be configured using computer code stored at memory 40 and/or 42 to provide processes 100, 200, 370, 399, and/or the like as disclosed herein.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as for example a computer or data processor circuitry. A computer-readable medium may comprise a non-transitory computer-readable storage medium that may be any media that can contain or store the instructions for use by or in connection with an instruction execution system, apparatus, or device, such as for example a computer. Furthermore, some of the embodiments disclosed herein include computer programs configured to cause operations as disclosed herein (see, for example, processes 100, 200, 370, 399, and/or the like).

FIG. 5 depicts an example implementation of a network node 500, such as base station 160A, in accordance with some example embodiments. The network node 500 may comprise an evolved node B base station configured to at least receive, during creation or modification of a bearer, a message including a handover threshold based at least in part on a type of codec for the bearer and/or whether redundancy is being used for that bearer; receive, from a user equipment, a measurement report providing an indication of a condition of the bearer; and/or determine, based at least on the handover threshold, whether to initiate a handover. The network node 500 may perform one or more operations disclosed herein with respect to the base station 160A (see, e.g., process 100, 200, 370, 399, and/or the like).

The network node 500 may include one or more antennas 520 configured to transmit via a downlink and configured to receive uplinks via the antenna(s) 520. The network node 500 may further include a plurality of radio interfaces 540 coupled to the antenna 520. The radio interfaces may correspond one or more of the following radio access technologies: 5G, 4G, Long Term Evolution (LTE, or E-UTRAN), LTE-Advanced, Third Generation (3G, UTRAN, or high speed packet access (HSPA)), Global System for Mobile communications (GSM), wireless local area network (WLAN) technology, such as 802.11 WiFi and/or the like, Bluetooth, Bluetooth low energy (BT-LE), near field communications (NFC), 5G radio access technologies, and/or any other radio technology. The radio interface 540 may further include other components, such as filters, converters (for example, digital-to-analog converters and the like), mappers, a Fast Fourier Transform (FFT) module, and/or the like, to generate symbols for a transmission via one or more downlinks and to receive symbols (for example, via an uplink). The network node 500 may further include one or more processors, such as processor 530, for controlling the network node 500 and for accessing and executing program code stored in memory 535. In some example embodiments, memory 535 includes code, which when executed by at least one processor causes one or more of the operations described herein with respect to network node, such as a base station 160A.

In some example embodiments, the network node 500 may include the processor 530 and memory 535 configured to provide a core network node, such as the MME, PCRF, and/or packet gateway. For example, network node 500 may be configured to at least derive the codec being used for a bearer, whether redundancy is being used for a bearer, and/or determine the handover threshold.

Without in any way limiting the scope, interpretation, or application of the claims appearing below, a technical effect of one or more of the example embodiments disclosed herein may be to reduce un-necessary handovers when the codec at a user equipment is sufficiently robust to handle poor radio conditions.

If desired, the different functions discussed herein may be performed in a different order and/or concurrently with each other. Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of the present invention as defined in the appended claims. Other embodiments may be within the scope of the following claims. The term "based on" includes "based on at least."

What is claimed:
1. An apparatus comprising:
at least one processor; and
at least one memory including program code which when executed causes the apparatus to at least:
during creation or modification of a bearer, receive, from a management node, a message including a handover threshold that is determined based at least in part on a type of codec for the bearer,
wherein the codec is configured to encode a voice call or a media call and information of the type of codec is obtained during the creation or modification of the bearer,
wherein the apparatus comprises, or is comprised in, a base station,
wherein the handover threshold is determined by a policy and charging rules function node based at least on codec and/or redundancy information obtained by the policy and charging rules function node, and
wherein the handover threshold comprises a packet loss threshold;
receive, from a user equipment, a measurement report providing an indication of a condition of the bearer, and/or perform a measurement, by the apparatus, providing the indication of the condition of the bearer; and in response to the measurement report and/or the measurement providing the indication of the condition of the bearer, determine, based at least on the condition of the bearer exceeding the handover threshold, whether to initiate a handover.

2. The apparatus of claim 1,
wherein the handover threshold is determined such that the packet loss rate of the handover threshold is set based at least on the robustness to packet losses corresponding to the type of codec.

3. The apparatus of claim 1,
wherein the handover threshold is derived from session description protocol information within a session initiation protocol.

4. The apparatus of claim 1,
wherein the apparatus is further configured to at least adjust the handover threshold to take into account characteristics of a radio interface in use by the user equipment.

5. The apparatus of claim 1,
wherein the handover threshold is received via at least one of a bearer setup request message or a bearer modify request message.

6. A method comprising:
during creation or modification of a bearer, receiving, at a base station and from a management node, a message including a handover threshold that is determined based at least in part on a type of codec for the bearer,
wherein the codec is used to encode a voice call or a media call, and information of the type of codec is obtained during the creation or modification of the bearer,
wherein the handover threshold is determined by a policy and charging rules function node based at least on codec and/or redundancy information obtained by the policy and charging rules function node, and
wherein the handover threshold comprises a packet loss threshold;
receiving, at the base station, a measurement report from a user equipment, the measurement report providing an indication of a condition of the bearer, and/or performing a measurement, by the base station, providing the indication of the condition of the bearer; and
in response to the measurement report and/or the measurement providing the indication of the condition of the bearer, determining, by the base station and based at least on the condition of the bearer exceeding the handover threshold, whether to initiate a handover.

7. The method of claim 6,
wherein the handover threshold is derived from session description protocol information within a session initiation protocol.

8. The method of claim 6, further comprising:
adjusting the handover threshold to take into account characteristics of a radio interface in use by the user equipment.

9. The method of claim 6,
wherein the handover threshold is received via at least one of a bearer setup request message or a bearer modify request message.

10. An apparatus comprising:
at least one processor; and
at least one memory including program code which when executed causes the apparatus to at least:
receive a message requesting a creation and/or a modification of a bearer,
wherein the apparatus comprises or is comprised in a policy and charging rules function node;
determine, based at least on codec and/or redundancy information obtained by the policy and charging rules function node, a handover threshold,
wherein the codec for the bearer is configured to encode a voice call or a media call,
wherein the handover threshold comprises a packet loss threshold; and
send, towards a mobility management entity, the handover threshold.

11. The apparatus of claim 10,
wherein the apparatus is further configured to at least derive the handover threshold from session description protocol information within a session initiation protocol.

12. The apparatus of claim 10,
wherein the handover threshold is determined based at least in part on whether redundancy is being used for the bearer.

13. A method comprising:
receiving, at a policy and charging rules function node, a message requesting a creation and/or a modification of a bearer;
determining, by the policy and charging rules function node and based at least on codec and/or redundancy information obtained by the policy and charging rules function node, a handover threshold,
wherein the handover threshold comprises a packet loss threshold,
wherein the codec for the bearer is configured to encode a voice call or a media call; and
sending, by the policy and charging rules function node, the determined handover threshold towards a mobility management entity.

14. The method of claim 13, further comprising:
deriving the handover threshold from session description protocol information within a session initiation protocol.

15. The method of claim 13,
wherein the handover threshold is determined based at least in part on whether redundancy is being used for the bearer and/or based on the codec being used.

16. The method of claim 13,
wherein the handover threshold further comprises a radio signal strength threshold, and/or a quality threshold.

17. The apparatus of claim 1,
wherein the base station is implemented as an evolved node B base station.

* * * * *